(12) United States Patent
NakaMats

(10) Patent No.: US 12,487,516 B2
(45) Date of Patent: Dec. 2, 2025

(54) PROJECTED IMAGE FIREWORKS

(71) Applicant: Dr. NakaMats Innovation Institute, Setagaya-ku Tokyo (JP)

(72) Inventor: Yoshiro NakaMats, Setagaya-ku Tokyo (JP)

(73) Assignee: DR. NAKAMATS INNOVATION INSTITUTE, Tokyo (JP)

( * ) Notice: Subject to any disclaimer, the term of this patent is extended or adjusted under 35 U.S.C. 154(b) by 272 days.

(21) Appl. No.: 17/795,623

(22) PCT Filed: Jan. 26, 2021

(86) PCT No.: PCT/JP2021/002682
§ 371 (c)(1),
(2) Date: Jan. 13, 2023

(87) PCT Pub. No.: WO2021/153569
PCT Pub. Date: Aug. 5, 2021

(65) Prior Publication Data
US 2023/0147680 A1    May 11, 2023

(30) Foreign Application Priority Data
Jan. 27, 2020    (JP) ................. 2020-011234

(51) Int. Cl.
*G03B 21/60*    (2014.01)
*G09F 19/18*    (2006.01)

(52) U.S. Cl.
CPC ............ *G03B 21/60* (2013.01); *G09F 19/18* (2013.01)

(58) Field of Classification Search
CPC ............................................ H04N 13/388–395
See application file for complete search history.

(56) References Cited

U.S. PATENT DOCUMENTS

| | | | | |
|---|---|---|---|---|
| 2,827,831 | A * | 3/1958 | Elion | G09F 19/18 353/62 |
| 7,710,643 | B2 * | 5/2010 | Mitchell-Dignan | F42B 12/48 353/62 |
| 7,757,607 | B1 * | 7/2010 | Deye | F41F 1/06 102/214 |

(Continued)

FOREIGN PATENT DOCUMENTS

| | | |
|---|---|---|
| CN | 102096296 | 6/2011 |
| CN | 102096296 A * | 6/2011 |

(Continued)

OTHER PUBLICATIONS

Grundhöfer, A., and D. Iwai. "Recent Advances in Projection Mapping Algorithms, Hardware and Applications." Computer Graphics Forum 37, No. 2 (May 2018): 653-75. https://doi.org/10.1111/cgf.13387 (Year: 2018).*

(Continued)

*Primary Examiner* — Leon W Rhodes, Jr.
(74) *Attorney, Agent, or Firm* — Wenderoth, Lind & Ponack, L.L.P.

(57) ABSTRACT

At fireworks shows and other venues where smoke is generated, waiting until the smoke clears before launching the next firework is a waste of time and lack of interest on the part of the spectators. This invention is a fireworks method that utilizes the smoke from fireworks to produce images by projection such as projection mapping.

7 Claims, 6 Drawing Sheets

(56) References Cited

U.S. PATENT DOCUMENTS

| | | | | |
|---|---|---|---|---|
| 9,942,539 B2* | 4/2018 | Tait | ...................... | H04N 13/398 |
| 2002/0171039 A1* | 11/2002 | Bennett | ..................... | F42B 4/00 |
| | | | | 250/573 |
| 2015/0317924 A1 | 11/2015 | Park | | |

FOREIGN PATENT DOCUMENTS

| | | | | |
|---|---|---|---|---|
| CN | 209116879 | | 7/2019 | |
| DE | 19954790 A1 * | | 5/2001 | ............. G09F 21/12 |
| JP | 57-27290 | | 2/1982 | |

OTHER PUBLICATIONS

Tokuda, Yutaka, Mohd Adili Norasikin, Sriram Subramanian, and Diego Martinez Plasencia. "Mistform." Proceedings of the 2017 CHI Conference on Human Factors in Computing Systems, May 2, 2017. https://doi.org/10.1145/3025453.3025608 (Year: 2017).*

"2018 Tokyo Bay Fireworks Display" by A&C Tours Japan, https://www.youtube.com/watch?v=tGqY0n5vCZ4 , Sep. 14, 2018 (Year: 2018).*

"Adachi-Ku Hanabi 2018 | Japan Vlog" by Nusrat Eka, https://www.youtube.com/watch?v=b5NiRMV5120 , Jul. 23, 2018 (Year: 2018).*

"Under the Lights July 4th Celebration fireworks finale" by WTVR CBS 6 , https://www.youtube.com/watch?v=SSqjlanwk1g , Jun. 4, 2020 (Year: 2020).*

International Search Report dated Mar. 30, 2021 in International (PCT) Application No. PCT/JP2021/002682.

* cited by examiner

[Fig. 1]
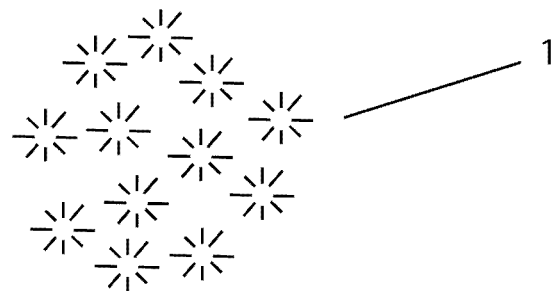
[Fig. 2]
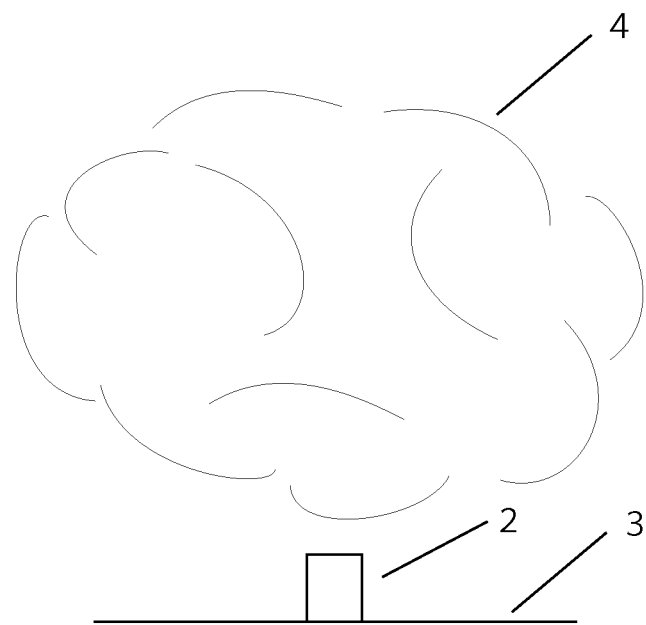

【Fig.3】
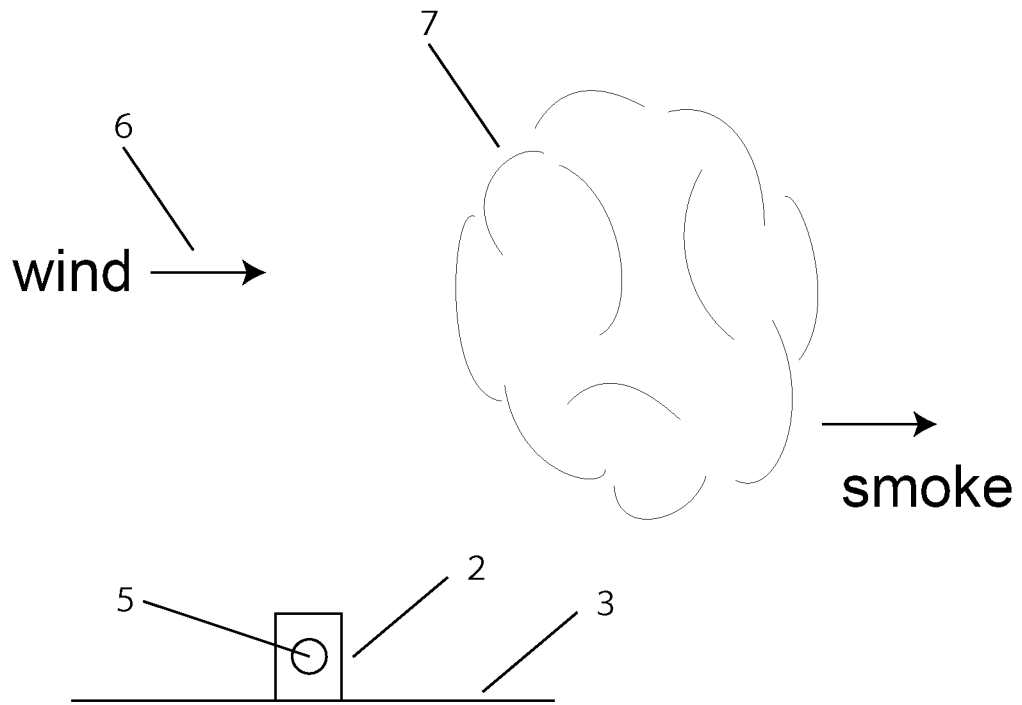
【Fig.4】
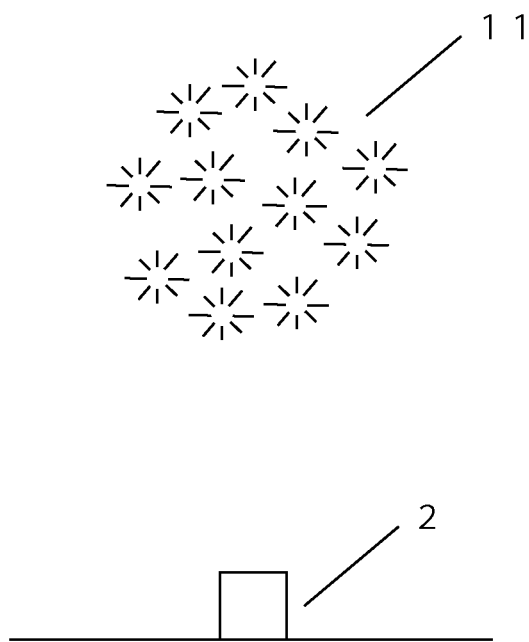

[Fig. 5]
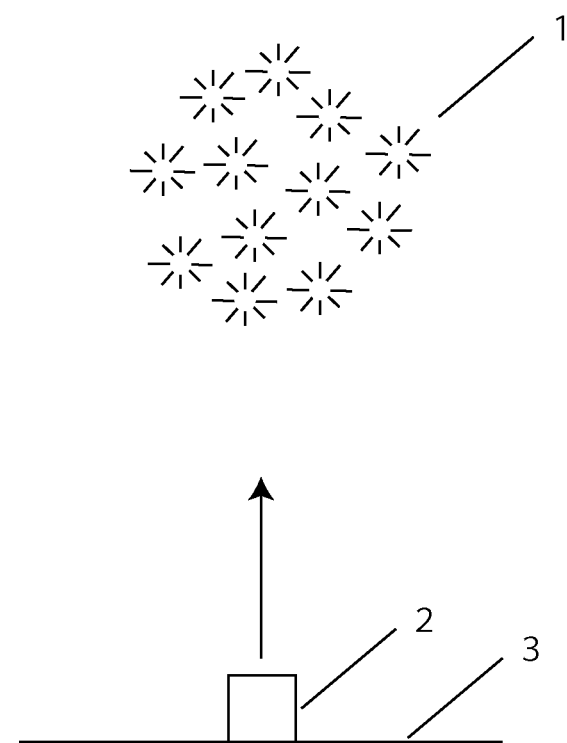

【Fig.6】
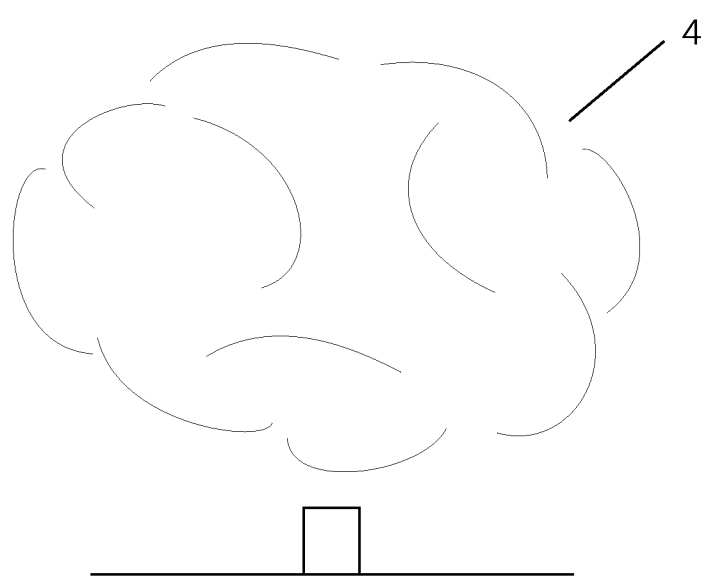

[Fig. 7]
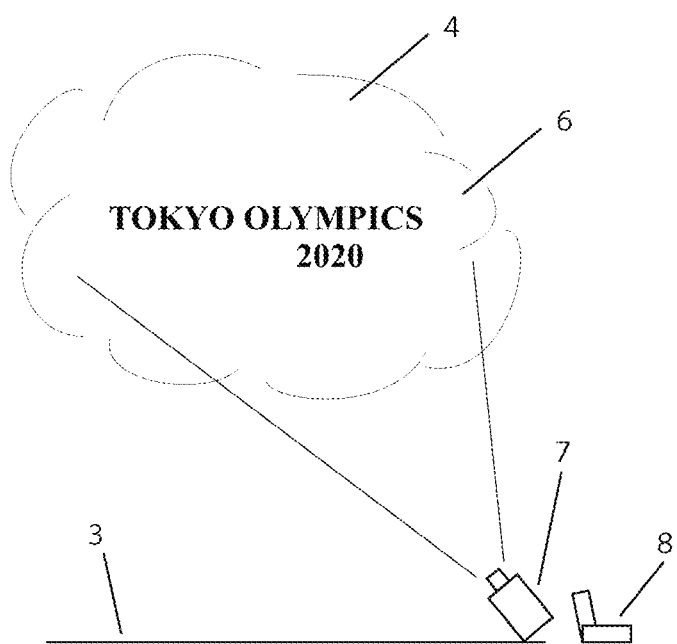

[Fig. 8]
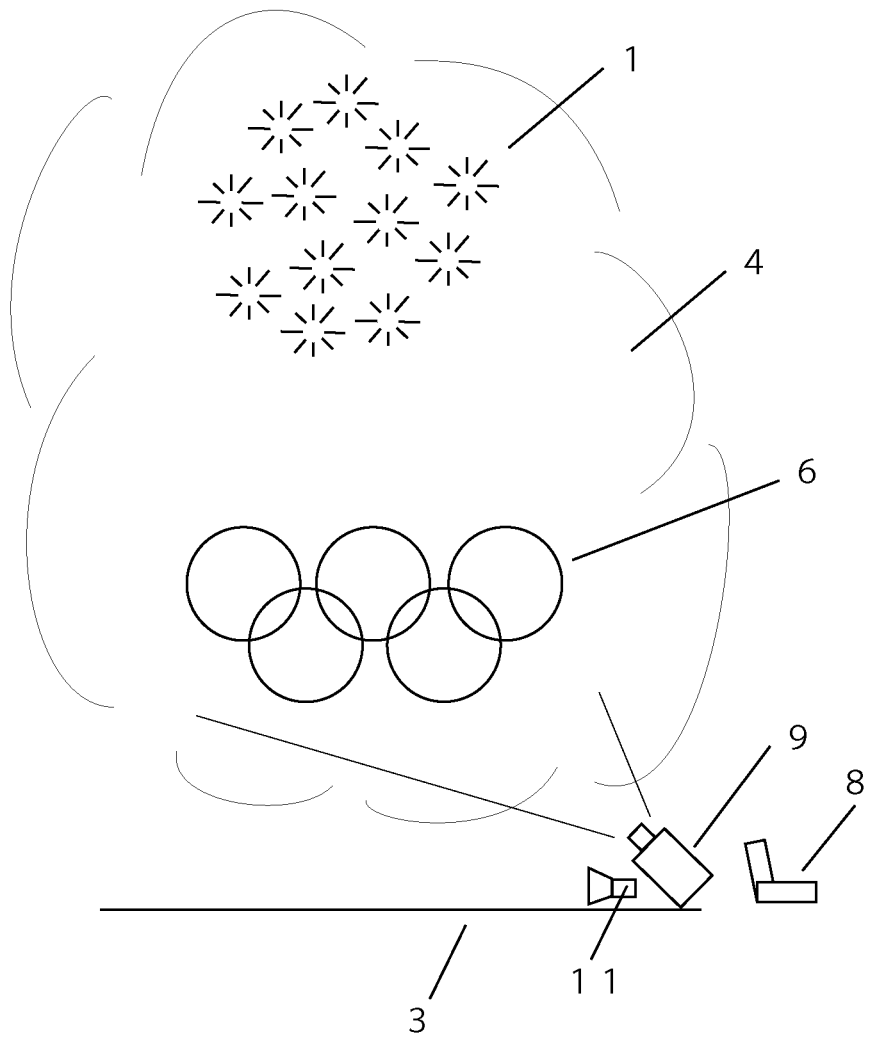

PROJECTED IMAGE FIREWORKS

TECHNICAL FIELD

This invention relates to a new method of producing fireworks.

BACKGROUND ART

In the past, when fireworks were fired at a fireworks display, smoke was generated in the sky and/or on the ground, and we had to wait until the smoke was blown away by the wind before firing the next firework. This is because fireworks cannot be launched in succession when this smoke is present, as the smoke would obscure the fireworks. This results in a long interval between the launching of fireworks, which bores the viewers and reduces their enjoyment and wastes their time.

CITATION LIST

Patent Literature

[Patent Literature 1] JP2016-152586A

SUMMARY OF INVENTION

Technical Problem

There has been no idea of utilizing the smoke generated at a fireworks site for projection. The smoke generated at the fireworks site was so disturbing that we had to wait for the wind to naturally clear the smoke. However, this invention, on the contrary, actively utilizes the smoke, which has been an obstacle in the past, and allows for more enjoyment during the launching without having to wait for the interval between the launching of fireworks.

Solution to Problem

The smoke generated by fireworks is effectively utilized to entertain the audience.

This invention is a way of showing fireworks by utilizing the smoke as a screen and combining it with projection mapping until the next firework is shot off.

Advantage Effects of Invention

The smoke generated when fireworks are shot off is not wasted, and images can be projected while the next fireworks are being shot off, or by combining the next fireworks and images, such as projection mapping. Thereby increasing the interest of viewers and making watching fireworks more enjoyable.

BRIEF DESCRIPTION OF DRAWINGS

FIG. 1 A figure of a firework launched into the air and ignited in a known method of fireworks.

FIG. 2 A figure of firework filled with smoke after ignition in a known method of fireworks.

FIG. 3 A figure of waiting for the smoke to dissipate with the wind in a known method of fireworks and the next firework being prepared.

FIG. 4 A Figure of a known method of fireworks in which the next firework is launched into the air and ignited after waiting until the smoke clears.

FIG. 5 The example 1 of this invention, in which a firework is launched into the air and ignited.

FIG. 6 Fireworks smoke is generated in the example 1 of this invention.

FIG. 7 This is the example 1 of the present invention in which the smoke generated by the launching and ignition of fireworks is imaged by projection mapping or other methods without waiting for the smoke to dissipate.

FIG. 8 The example 2 of this invention in which projection mapping and other images are projected while the smoke and fireworks generated by the launching and ignition of fireworks remain, and projection images and fireworks coexist.

DESCRIPTION OF EMBODIMENTS

The situation of known conventional fireworks is illustrated in FIGS. 1-4.

As shown in FIG. 1, the figure depicts fireworks being launched into the air by the launcher 2, which is installed on the ground 3. Fireworks produce light, color, sound, and smoke.

FIG. 2 shows the state after ignition and emission. Smoke 4 generated when gunpowder for fireworks and firing charges are ignited will drift on the ground surface or in the air. The way the smoke drifts depends on the wind and weather conditions, but after the fireworks are ignited, the air is filled with smoke.

FIG. 3 shows a situation in which the next firework 5 is ready in the launcher 2 but cannot be launched due to the aforementioned smoke 4. The smoke on the ground surface and in the sky is removed by the wind 6 and moved 7 before being launched. Waiting for this is a waste of time.

FIG. 4 shows a known firework that is finally launched into the air and ignited11 after the smoke7 has moved as shown in FIG. 3.

This invention does not wait for this smoke to dissipate, but instead makes effective use of it in the opposite direction.

FIGS. 5-7 illustrate the first example of the invention.

In the present invention, Fireworks 1 is launched as shown in FIG. 5. The figure shows the state in which the firework is launched into the air, ignites and emits light.

Smoke 4 is produced as shown in FIG. 6.

FIG. 7 shows a projection mapping or other image using the smoke as a screen until the smoke is blown away by the wind, without waiting for the smoke to be cleared by the wind as in FIG. 3. This means that the spectators do not have to wait until the smoke clears before firing the next fireworks, but can enjoy them continuously without wasting time waiting.

FIG. 8 illustrates the example 2 of the invention. In FIG. 8, Fireworks 1 is ignited and emitted, and at the same time, an image 8 is projected on the smoke 4 generated by Fireworks 1 by a projector using projection mapping, etc. This allows the audience to enjoy the image 6 and the fireworks 1 at the same time, creating an effect of surprise and delight that has never been seen in fireworks before.

The example 3 of the present invention is to make images visible from multiple directions in a venue by using multiple projectors 7.

The example 4 of this invention is the coexistence of three-dimensional images and fireworks in the air using multiple 7 projectors.

The example 5 of this invention is to use fireworks that emit smoke to actively create thick smoke to be used as a screen.

This allows the images to be seen even more clearly and over a wider area, and the audience can further enjoy the co-starring effects of the luminous fireworks.

The screen may measure the distance with a short wavelength sensor that can detect clouds and project images onto the smoke while controlling the focus and timing of the images using a computer that responds to unevenness and movement. This is the example 6 of the present invention, which allows the user to see clear images with minimal wind effects.

The example 7 of the present invention is to project the beautiful colors and shape trajectory of the luminescence of the fireworks and the images by projection mapping, etc. in sync, and superimpose the smoke fire and the projection mapping images. This allows the viewer to enjoy the colors, shapes and movements of the fireworks and images even more vividly.

This invention is not limited to fireworks smoke, but also includes projection mapping from a low-flying airplane emitting a smoke screen and projection mapping on this smoke screen. This allows spectators to be entertained even after the plane has passed by.

As described above, this invention has the effect of projecting images in the air without a screen by using projection mapping or other means to produce images on smoke, which is a floating object in the air generated by fireworks and airplanes. In particular, Example 8 of the present invention can be used to entertain spectators at fireworks displays and air shows until the next program starts.

As shown in FIG. 8, Example 9 of the present invention is to install a sound system (11) to perform fireworks, video, and sound simultaneously or separately.

INDUSTRIAL APPLICABILITY

This invention provides an enjoyable fireworks viewing experience and saves time.

REFERENCE SIGNS LIST

1 Luminous Fireworks
1 1 The next firework that emitted
2 Firing tube
3 Ground
4 Fireworks smoke
5 Next fireworks
6 Wind
7 Wind-driven smoke
8 Projection mapping images
9 Projector
10 Computer
11 Acoustic equipment

The invention claimed is:

1. A method of displaying images in air comprising:
   launching a first firework into the air, the first firework igniting while in the air to emit first light and generate smoke;
   projecting, using at least one projector, an image on the smoke generated by the first firework, the image being a text image or graphic image; and
   launching a second firework into the air, the second firework igniting while in the air to emit second light,
   wherein the projecting the image on the smoke generated by the first firework is performed after the launching of the first firework and before the launching of the second firework,
   the launching the second firework into the air is performed after the launching the first firework into the air and while the image is being projected on the smoke generated by the first firework in the projecting so that the second firework ignites in the air while the image is being projected on the smoke generated by the first firework in the projecting, and
   in the projecting, the image projected on the smoke is visible on the ground from multiple directions, and the image is projected on the smoke so as to be approximately positioned at a point where the first light is emitted by the igniting of the first firework.

2. The method claim 1, further comprising generating smoke in the air different from the smoke generated by the first firework for projecting the image.

3. The method of claim 1, wherein the image is visible on the smoke generated by the first firework before disappearing by wind.

4. The method of claim 1, further comprising producing sounds that coordinate with the launching of the first or the launching of the second firework and the projecting of the image.

5. The method of claim 1, further comprising using projection mapping for projecting of the image on the smoke.

6. The method of claim 1, wherein the image is projected from at least two projectors and the image is a three-dimensional image.

7. The method of claim 1, wherein the smoke generated by the first firework drifts by natural winds, thereby creating a wider image display venue for the projecting of the image.

* * * * *